April 10, 1962 P. SPADOLINI 3,029,119
STANDARDIZED KNOCKDOWN FURNITURE ELEMENTS
Filed Nov. 21, 1958 2 Sheets-Sheet 1
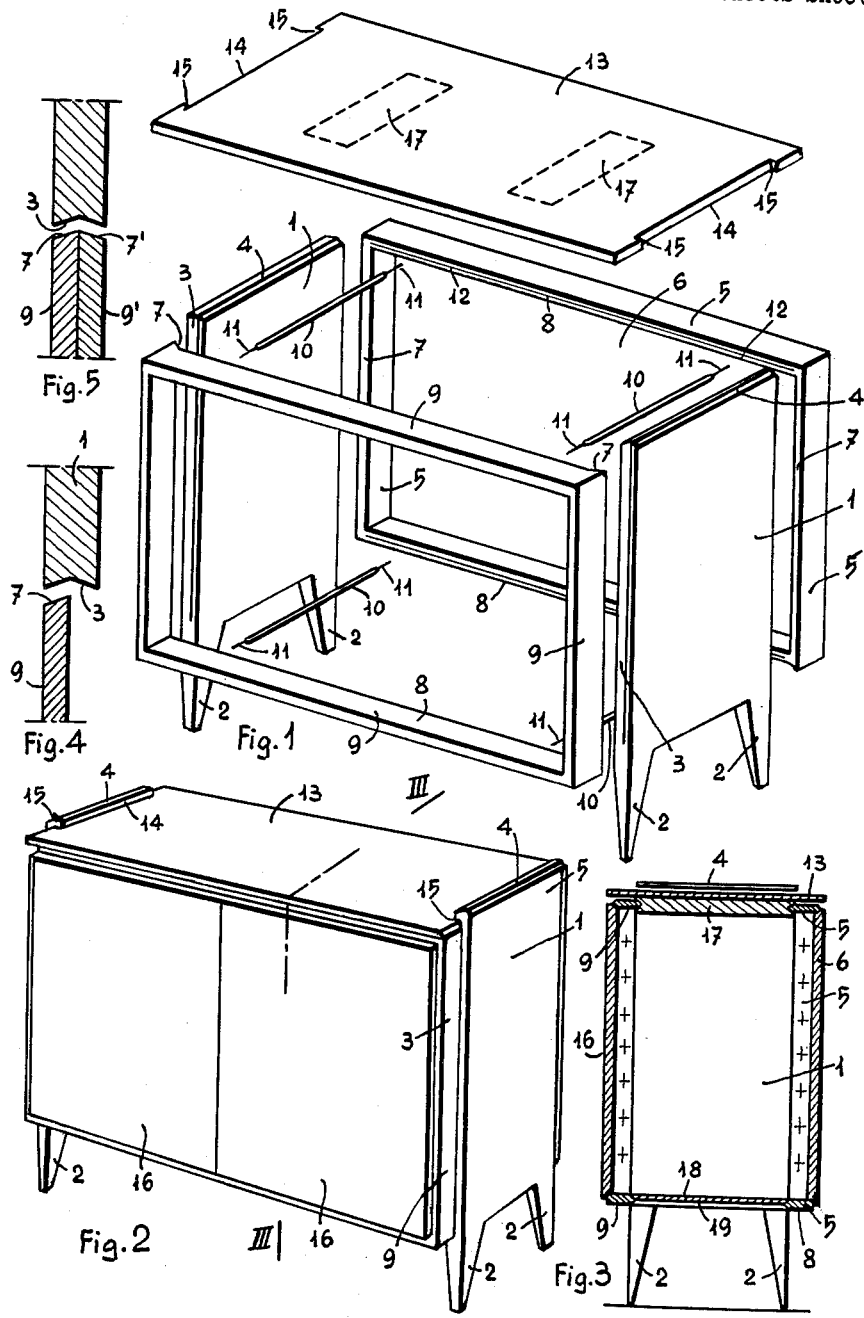

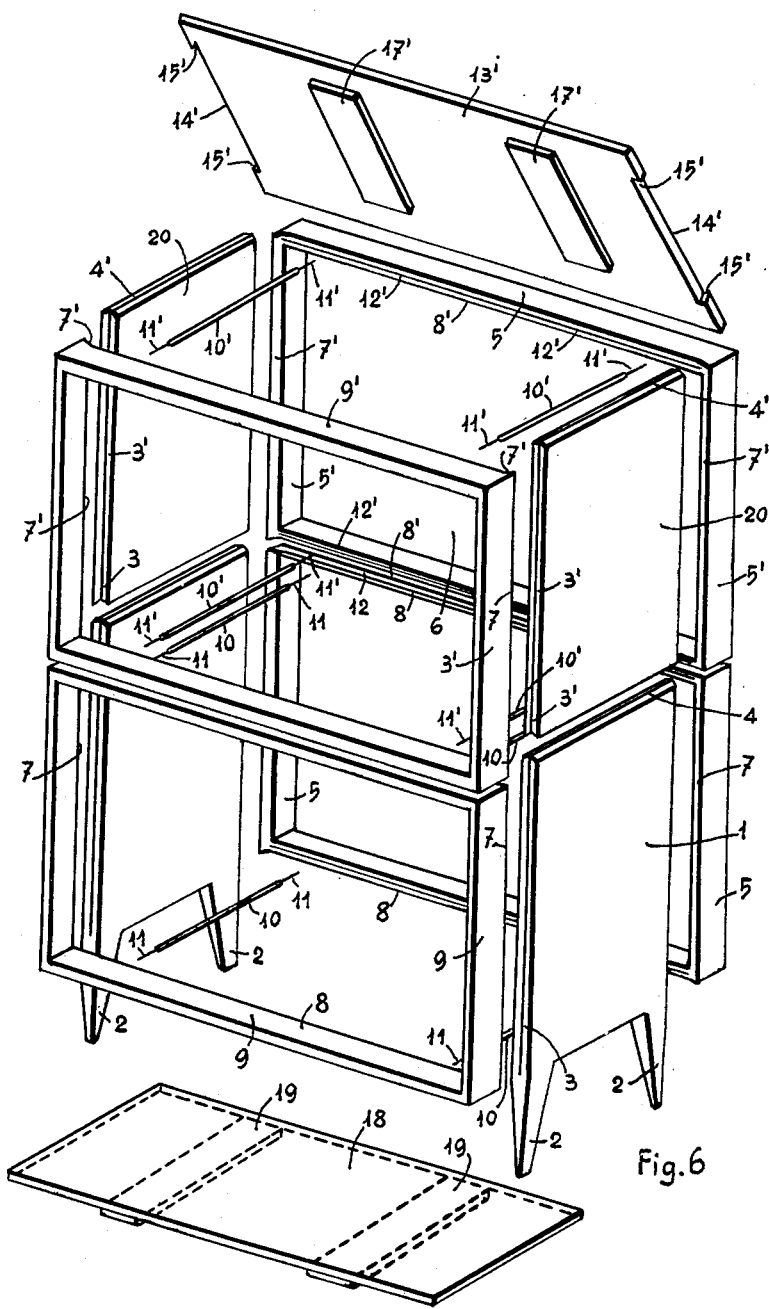

United States Patent Office
3,029,119
Patented Apr. 10, 1962

3,029,119
STANDARDIZED KNOCKDOWN FURNITURE ELEMENTS
Pierluigi Spadolini, Via Cavour 35, Florence, Italy
Filed Nov. 21, 1958, Ser. No. 775,570
Claims priority, application Italy Nov. 30, 1957
7 Claims. (Cl. 312—264)

The invention relates generally to knockdown furniture and more particularly to standardized elements that can be assembled into a variety of pieces of furniture. Technical developments and variable present necessities such as the modified use of rooms with decreased space and frequent movings, have made old furniture ill-fitted for present day use. A new type of furniture based on the use of mass-produced precut and prefabricated elements of standardized sizes which may be variously assembled to obtain pieces of furniture of different shapes and sizes for a variety of uses.

In such furniture, the assembly of the separate elements presents difficulties that must be met in order to realize a variety of different pieces from the same elements.

The present invention has for its object the provision of individual elements, which can be assembled into a variety of pieces of furniture.

These mass-produced elements of various sizes and shapes suitable for assembling into pieces of furniture of different sizes and compositions according to the present invention, are characterized by two elements arranged normal to each other and which must be reciprocally connected by complementary contacting edges which will interfit with each other, one edge projecting and the other edge recessed. Tension rod means are provided for holding the two elements with their complementary edges interfitting.

The elements are further characterized by their complementary contact edges being longitudinally interfitting projections and recesses.

The elements are also characterized in that complementary projections and recesses extend for the entire contact edges of the two elements.

The elements are further characterized in that one of them defines projections that are longitudinally half complementary to the associated recesses of the other elements, so that two elements, provided with half complementary projections when assembled together, form a projection that is complementary to the recess of the other element.

The above elements are finally characterized in that the complementary recess and interfitting complementary and half complementary projections permit the connection of elements in vertical and horizontal extension of each other.

Elements provided with the above characteristics and pieces of furniture produced by assembling said elements are shown schematically and only by way of example in the annexed drawings.

FIG. 1 is an exploded perspective view of the basic elements and shows two supporting end elements, two frame elements and a cover element, with tension rods in assembling positions;

FIG. 2 is a perspective view showing a piece of furniture assembled with the elements of FIG. 1 and completed with two openable vertically hinged doors;

FIG. 3 is a section of the piece of furniture of FIG. 2 along line III—III, showing a bottom element for the piece of furniture;

FIG. 4 is a cross-sectional view of a half complementary projection interfitting with a recess.

FIG. 5 is a cross-sectional view of two half complementary projections forming a projection complementary to and interfitting with a recess;

FIG. 6 is an exploded perspective view similar to FIG. 1 but showing supporting end elements connected vertically to form a vertically extended piece of furniture.

Referring to FIGS. 1 and 3 of the drawing, the invention comprises the following transverse and longitudinal structural elements. The transverse elements comprise precut rectangular supporting end elements 1 each having oppositely disposed upper and lower horizontal edges, and front and back vertical edges and each is provided on the lower edge with feet 2, on the vertical edges with vertical recesses 3, and on the upper edge with horizontal dihedral projections 4. The longitudinal elements include a prefabricated rectangular frame element 5 having opposite vertical sides and opposite horizontal sides spacing each other apart, with each side having an inner edge and an outer edge. The inner edge of the vertical sides of the frame element are provided with vertical dihedral projections 7 that are half complementary longitudinally with the dihedral recesses 3. The inner edges of the horizontal sides of the frame element 5 are provided with horizontal dihedral projections 8 for interfitting with a cover element 13 and a bottom element 18. A back closure 6 comes fastened to the outer edges of the horizontal and vertical sides of frame element 5. A second frame element 9 is provided with the same vertical dihedral projections 7 and horizontal dihedral projections 8 as the frame element 5. Transverse tension rods 10, having oppositely threaded ends, engage nuts 12 oppositely fixed in the frame elements 5 and 9 to draw the frame elements toward each other and into tight interfitting connection with the other elements. The longitudinal cover element 13 has two lower crossbars 17 with ends defining horizontal dihedral recesses for interfitting with the horizontal dihedral recesses defined by the edges of the upper horizontal sides of the frame elements, and has two recesses 14 in its ends for the extension of the two supporting end elements 1 therethrough, the recesses 14 have vertical dihedral projections 15 similar to dihedral projection 7 and half complementary with dihedral recesses 3. Two openable doors 16 are hinged to the outer vertical edges of frame element 9 as a front closure. The longitudinal bottom element 18 has two lower cross bars 19 with ends that form dihedral recesses with the bottom edges for interfitting with the complementary dihedral projection defined by the inner edges of the lower horizontal sides of the frame elements 5 and 9.

The above mentioned elements are assembled as follows: the two frame elements 5 and 9 are placed in the back and front respectively of the two supporting end elements 1 which are vertically positioned with their feet downwardly directed. These elements are joined by their dihedral projections 7 and recesses 3 interfitting, the projections 7 being longitudinally half complementary to the respective dihedral recesses 3. The frame elements are then locked in place by means of the metallic tension rods 10 which are rotated so that the opposite screw threads on the ends of the tension rod engaging the nuts in the frame elements draws the two facing frame elements toward each other and locks them to the supporting end members.

Before locking the two frame elements in place, the cover element and the bottom element of the piece of furniture are inserted between them and in their respective places. The cover element with two wooden crossbars fastened to the lower surface the crossbars ending in horizontal dihedral recesses complementary to and interfitting the horizontal dihedral projections of the frame elements is held in its place thereby. The bottom element, with two wooden crossbars fastened to the lower surface, the crossbars forming with the front and back edges of the bottom element horizontal dihedral recesses complementary to and interfitting with the horizontal dihedral projections of the frame elements, is thereby held in place. The tension rods are then rotated, successively, until the frames are parallelly in contact with the supporting end elements with the projections interfitting with the associated recesses. The cover element, besides completing the piece of furniture, constitutes a spacing member and a horizontal connection, normal to the tension rods for locking the various elements connected to one another. The openable doors are then hinged to the front frame element to complete the piece of furniture.

To obtain a piece of furniture of double length, only three supporting end elements 1 are necessary. The intermediate supporting end element which has its vertical dihedral recesses interfitting with the two half complementary vertical dihedral projections of two frames positioned side by side, two half complementary projections together being complementary to and engaging in a dihedral recess of the intermediate supporting end element. (See FIG. 5, dihedral projections 7, 7' and dihedral recesses 3.)

Thus to obtain a piece of furniture of any multiple length, it is sufficient to provide as many supporting end elements as the pairs of longitudinal frame elements to be connected, plus one. Only the first and the last supporting end elements, that is, the end ones, are connected to frame elements as shown in FIG. 4, while the intermediate and internal ones are connected to frame elements as shown in FIG. 5.

To obtain a piece of furniture of multiple height, it is sufficient that supporting end elements 20 (see FIG. 6) be placed up on the supporting end elements. The supporting end elements 20 are similar to the supporting end elements 1 with the exception that the feet 2 of element 1 are replaced with a lower horizontal dihedral recess that is complementary to and interfits with the upper horizontal dihedral projection 4. The cover element 13 is removed from the lower piece of furniture and placed on the upper piece so that the horizontal internal division between the two vertically extended pieces is the bottom 18' of the upper piece of furniture. With the removal of its cover element 13, frames 5' and 9' of the upper piece rest directly on the frames 5 and 9 of the lower piece, so that the vertical dihedral projections 7' of the upper piece extend for a short distance in the dihedral recesses 3 of the lower piece, thereby locking the two pieces together when their tension rods are tightened. The remaining portion of the dihedral projections 7' of the upper piece contact dihedral recesses 3' of the supporting end elements of the upper piece.

Although the invention has been described with a certain degree of particularity, it is understood that the present disclosure has been made only by way of example and that numerous changes in the details of construction and the combination and arrangement of parts may be resorted to without departing from the spirit and the scope of the invention as hereinafter claimed.

What I claim is:

1. Improved knockdown furniture elements for assembly into a variety of pieces of furniture comprising: transverse support elements vertically arranged and longitudinally spaced apart for providing vertical supports for the assembled piece of furniture, each said support element having front and back vertical edges; front and back frame elements, each having upper and lower horizontal inner edges defining projections and vertical inner edges longitudinally spaced apart, said frame elements arranged intermediate the spaced support elements with the front vertical edges of adjacent support elements respectively contacting the longitudinally spaced vertical inner edges of a front frame element, and the back vertical edges of said adjacent support elements similarly contacting the longitudinally spaced vertical edges of a back frame element, each said contacting edge of a frame element respectively defining a projection for its full vertical extent and each said contacting edge of a support element respectively defining a recess of at least a vertical extent equal to said projection, and each said projection being shaped in cross-section half complementary to each said recess, and a pair of said projections arranged vertically together with their frame elements oppositely directed in the same plane being shaped in cross-section complementary to each said recess, said projections, singly and in oppositely disposed pairs, interfitting with said associated recesses to position and connect said support and frame elements in longitudinal extent for any multiple of front frame elements and the same number plus one of support elements, and transverse tension rod means engaging said front and back frame elements to draw said frame elements toward each other and tightly against said adjacent longitudinally spaced support elements with said projections and recesses interfitting and thereby locking said elements together.

2. Improved knockdown furniture elements as described in claim 1 wherein said recesses are each V-shaped in cross-section and similarly said projections are singly half V-shaped and complementary to the near half of a V-shaped recess, and said projections in oppositely disposed pairs, are V-shaped and complementary in combination to a V-shaped recess.

3. Improved knockdown furniture elements as described in claim 1 wherein said back frame element has outer edges to which a back closure is secured.

4. Improved knockdown furniture elements as described in claim 1 wherein each said transverse support element has an upper horizontal edge defining a projection for its full horizontal extent and a lower horizontal edge defining feet for resting on a plane surface.

5. Improved knockdown furniture elements as described in claim 1 wherein said transverse support elements have upper horizontal edges defining projections and lower horizontal edges defining recesses complementary in shape to said projections for extending said support elements vertically by interfitting a lower edge recess of a support member in the upper edge projection of another support member.

6. Improved knockdown furniture elements as described in claim 1 wherein a longitudinal cover element having upper and lower surfaces and oppositely disposed ends and cross bar means have oppositely disposed ends fastened to said lower surface, said oppositely disposed ends of said cross bar means defining horizontally extending recesses shaped complementary to said projections defined in the upper horizontal inner edges of said front and back frame elements for interfitting therewith to secure the cover element thereto, said cover element being recessed at each oppositely disposed end for said longitudinally spaced support elements to extend therethrough, said recess having its ends half complementarily shaped to engage in said recesses defined in the front and back edges of said support elements.

7. Improved knockdown furniture elements as described in claim 1 wherein a longitudinal bottom element having upper and lower surfaces, longitudinal edges and lower cross bar means having oppositely disposed ends fastened to said lower surfaces, said oppositely disposed ends together with said longitudinal edges shaped to form recesses complementary respectively to the projections defined by said horizontal lower inner edges of said front and back frame elements for interfitting therewith to secure said bottom element thereto.

References Cited in the file of this patent

UNITED STATES PATENTS

| | | |
|---|---|---|
| 828,133 | Morrison | Aug. 7, 1906 |
| 873,496 | Bryant | Dec. 10, 1907 |
| 873,555 | Kearns | Dec. 10, 1907 |
| 2,160,653 | Green | May 30, 1939 |
| 2,206,353 | Hill | July 2, 1940 |
| 2,240,767 | Friedel | May 6, 1941 |
| 2,696,419 | Wallance | Dec. 7, 1954 |
| 2,778,703 | McBride | Jan. 22, 1957 |

FOREIGN PATENTS

| | | |
|---|---|---|
| 1,148,545 | France | June 24, 1957 |
| 1,164,566 | France | May 19, 1958 |
| 330,420 | Switzerland | July 31, 1958 |